United States Patent [19]
Yuen

[11] Patent Number: 5,870,150
[45] Date of Patent: Feb. 9, 1999

[54] TELEVISION GUIDE READER AND PROGRAMMER

[75] Inventor: Henry C. Yuen, Redondo Beach, Calif.

[73] Assignee: Gemstar Development Corporation, Pasadena, Calif.

[21] Appl. No.: 706,132

[22] Filed: Aug. 30, 1996

Related U.S. Application Data

[60] Provisional application No. 60/033,040 Aug. 30, 1995.
[51] Int. Cl.⁶ ............................................. H04N 7/00
[52] U.S. Cl. ..................... 348/553; 348/906; 348/552
[58] Field of Search ................................ 348/552, 553, 348/460, 7, 906, 725, 569; 345/173, 180

[56] References Cited

U.S. PATENT DOCUMENTS

| | | | |
|---|---|---|---|
| 4,222,069 | 9/1980 | Groetschel | 358/127 |
| 4,329,684 | 5/1982 | Monteath | 345/173 |
| 5,119,075 | 6/1992 | Smith | 345/180 |
| 5,184,115 | 2/1993 | Black | 345/180 |
| 5,475,835 | 12/1995 | Hickey | 348/7 |
| 5,479,268 | 12/1995 | Young et al. | 348/906 |

*Primary Examiner*—Victor R. Kostak
*Attorney, Agent, or Firm*—Christie, Parker & Hale, LLP

[57] ABSTRACT

The encoded television receiver timer pre-programming indicia listed on reverse side of a program schedule page allows a timer pre-programming feature on a television or, in particular, a video cassette recorder (VCR) to be programmed. The control indicia are decoded by a decoder built into either the video cassette recorder or controller, which convert the indicia into channel, date, time and length information for timer preprogramming. The channel, date, time and length information is communicated to the VCR to automatically activate the VCR to record a given television program with the corresponding channel, date, time and length. Alternately, the channel, date, time and length information is decoded directly in the controller and appropriately sent to the VCR for recording a program. The program schedule pages with control indicia utilized with the present invention can be printed in advance and used with a VCR or controller with the decoding.

22 Claims, 15 Drawing Sheets

TELEVISION GUIDE READER AND PROGRAMMER

CROSS REFERENCE TO RELATED APPLICATIONS

This application is based on and claims the priority of provisional patent application Ser. No. 60/003,040 filed Aug. 30, 1995.

1. Field of the Invention

The present invention relates to a television guide reader and programmer and, more particularly, to a new television guide reader that uses a schedule page of television program listings combined with a touch display or other sensor for receiving input to select a program for viewing and/or recording.

2. Background of the Invention

Many common sources exist for television programming schedules in tabular format. In typical tabular formats, one axis represents network programming while the other represents the various time periods. Thus, a multihour block of programming on numerous networks may be graphically represented in a small space. Such tabular broadcast programming guides are found in newspapers, both in many daily publications, as well as in weekly "T.V. Supplement" sections; and may also be found in independent, commercially available guides.

However, in metropolitan areas where more than one cable company may participate in serving customers, there is typically no uniformity between the channels upon which specific programs may be carried by the various cable companies servicing a given area. For example, while one cable company may carry a certain network on channel 4, another cable broadcaster may carry the same network on channel 30. The problem exists that a television viewer wishing to tune to a specific network must then correlate, either through memorization of the plethora of network options or through the tabular reference, the desired network with its channel relative to a particular channel receiving unit.

A second prevailing problem for television viewers is that the use of magnetic recording equipment, specifically VCRs, in combination with a television receiver to selectively record a program a person may find particularly interesting is complicated. One solution which is recognized the use of compressed codes in the VCR Plus+ automatic programming system. The recordation of programs has been popular since the advent of the home VCR system. The user of a VCR often desires to record programs that he would be unable to see or hear at the time of their actual transmission. The user who is unable to view the program at its time of transmission often is unable to set the recording equipment and television receiver on and off at the appropriate time to record the selected program. Thus, in the typical video recording unit, a time switch is utilized which automatically switches the recording equipment on and off at preselected program transmission times. The problem is that the programming of a VCR to turn on and off through the use of this time switch means is difficult requiring an input from a great number of keystrokes, and often takes a user a great deal of time.

There are some existing devices which can be used as television programmers or guides that respectively provide for easy programming of the television receiver, or VCR, or for a program guide for television viewers.

Several devices disclose a means for displaying printed schedule information of the television listings. In one device, information is contained in a roll and may be driven through the device for viewing through a lens or magnifying window. Another programming guide device discloses an overlay for viewing grid type television schedules. The purpose of the overlay is to facilitate the use of a single schedule in situations where there are varying channel maps. While both of these devices can be utilized as simple program guides, they do not provide for the control of a television receiver or video cassette recorder in combination with this guide for easier viewing and/or programming.

Another approach is disclosed in U.S. Pat. No. 4,329,684 to Monteath et al. Monteath et al. discloses a system wherein a light pen is used to read bar codes from a broadcasting periodical or to point to a program displayed in an on-screen schedule. The data read by the light pen from the bar codes or from the screen is used to preprogram a television receiver or alternatively is simply stored or printed. This device provides for the control of a receiver solely through the use of a light pen. The system does not specifically disclose how the bar codes are to be read by the light pen in order to control the television receiver. That is, a detailed description of how a light pen is to read bar codes and how the information obtained from the bar codes is to control a television receiver is not provided. It does not provide a housing for the easy viewing of a schedule page of television program listings at a user's leisure. Moreover, it does not provide for the easy recording of television programs, or the control of a video cassette recorder.

Finally, to improve on the time switch means to record programs included within VCRs, one system, described in Groetschal, U.S. Pat. No. 4,222,069, includes a data carrier, or sheet, which bears program schedule information along information tracks. The time of day is printed on a time track. Immediately to the left of the information tracks are command tracks. The user who wishes to record a program listed on an information track places a first mark on the command track immediately to its left to indicate the start time of the program and a second mark at a later time to indicate the end time. The data carrier may be fed into a control apparatus through the use of an endless belt or conveyer. A scanner is provided to read the information from the data carrier which is used to control the video cassette recorder. The data carrier is scanned along the command tracks in conformity with the elapse of time during the day to generate signals for switching on the receiver and selecting the appropriate receiver channel.

This system, while simpler than programming the time switch means, is limited by the amount of programming a user may accomplish. That is, based on its columnar schedule and conveyor belt, the system is limited in the amount of preprogram information it can store. In addition, the system does not use a stationary page so that the user may view a program guide at his leisure or provide a schedule of programs on the page.

Therefore, there is a need for a television guide reader and programmer that can provide a stationary schedule page for the user to view at his leisure and that can provide start and stop time of the recording for the video cassette recorder through the use of a touch sensors for receiving input.

The television guide reader and programmer of the present invention effectively overcomes the drawbacks of the prior art while meeting the aforementioned needs. Specifically, the invention provides a stationary schedule page that does not rotate away from the user in order to control the video cassette recorder. Thus, the user may view the present schedule page for as long as he desires. When the user finds a program that he wishes to record, he presses the touch display or other input receiving sensor. The user is provided with a program guide with control indicia that allows for a simple way to view and/or record programs.

SUMMARY OF THE INVENTION

There is provided in a preferred embodiment of the present invention, a television guide reader and programmer apparatus and method. A principal object of the invention is to provide an improved system for the selection and entering of channel, date, time and length (CDTL) information required for preprogramming of a television receiving unit such as a VCR which is substantially simpler, faster and less error-prone than present techniques.

In accordance with the present invention, to program the timer preprogramming feature of a video system, there is an apparatus and method for a television guide reader that uses a schedule page of television program listings combined with a touch sensor for receiving input to select a program for viewing and/or recording. The purpose is to significantly reduce the number of keystrokes required to set up the timer preprogramming feature on a television or VCR. In accordance with the present invention, it is only necessary for the user to select a point on the schedule page of television program listings in order to view or record a specific program. Built in to either the controller or the receiver is a determining means which automatically converts the indicia into the proper CDTL programming information which activates the television to view, or the VCR to record, a given television program with the corresponding channel, date, time and length. The schedule page of television program listings can be printed in advance and selected for use with a controller or VCR with the determining means.

Other objects and many of the attendant features of this invention will be more readily appreciated as the same becomes better understood by reference to the following detailed descriptions and considered in connection with the accompanying drawings in which like reference symbols designate like parts throughout.

DETAILED DESCRIPTION

Figure 1:
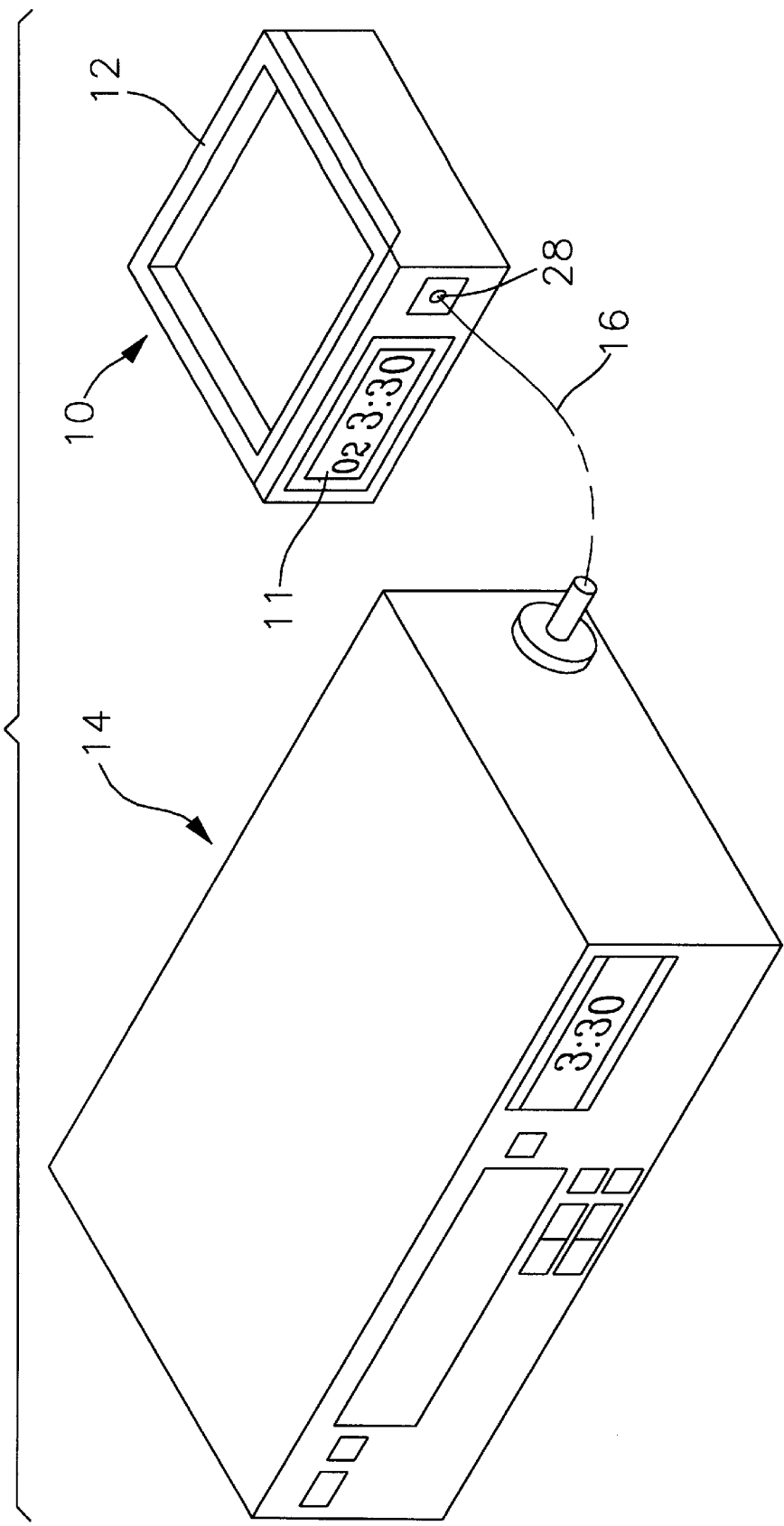
FIG. 1 is a perspective view showing an apparatus according to this invention and a television receiving unit in the form of a video cassette recorder.

Referring now to the drawings, and more particularly, to FIG. 1, there is shown a controller apparatus 10 for a television guide reader that uses a schedule page of television program listings combined with a touch display or other sensor for receiving input to select a program for viewing and/or recording. The illustration includes the controller 10 and a television receiving unit such as a VCR 14 which can be controlled by the controller 10 via a command signal 16.

The controller 10 is shown remote from the television receiving unit. However, it may be included within a VCR or television receiver. The controller has a frame 12 which can be opened and in which a schedule page of television program listings can be placed. There are means in the controller that detect each position of the television listings as it is pressed and sends a signal 16 to the VCR via an infrared light emitting diode 28 if remote or by wire (not shown) if integral with the VCR. In addition, the controller may have a display 11.

Figure 2:
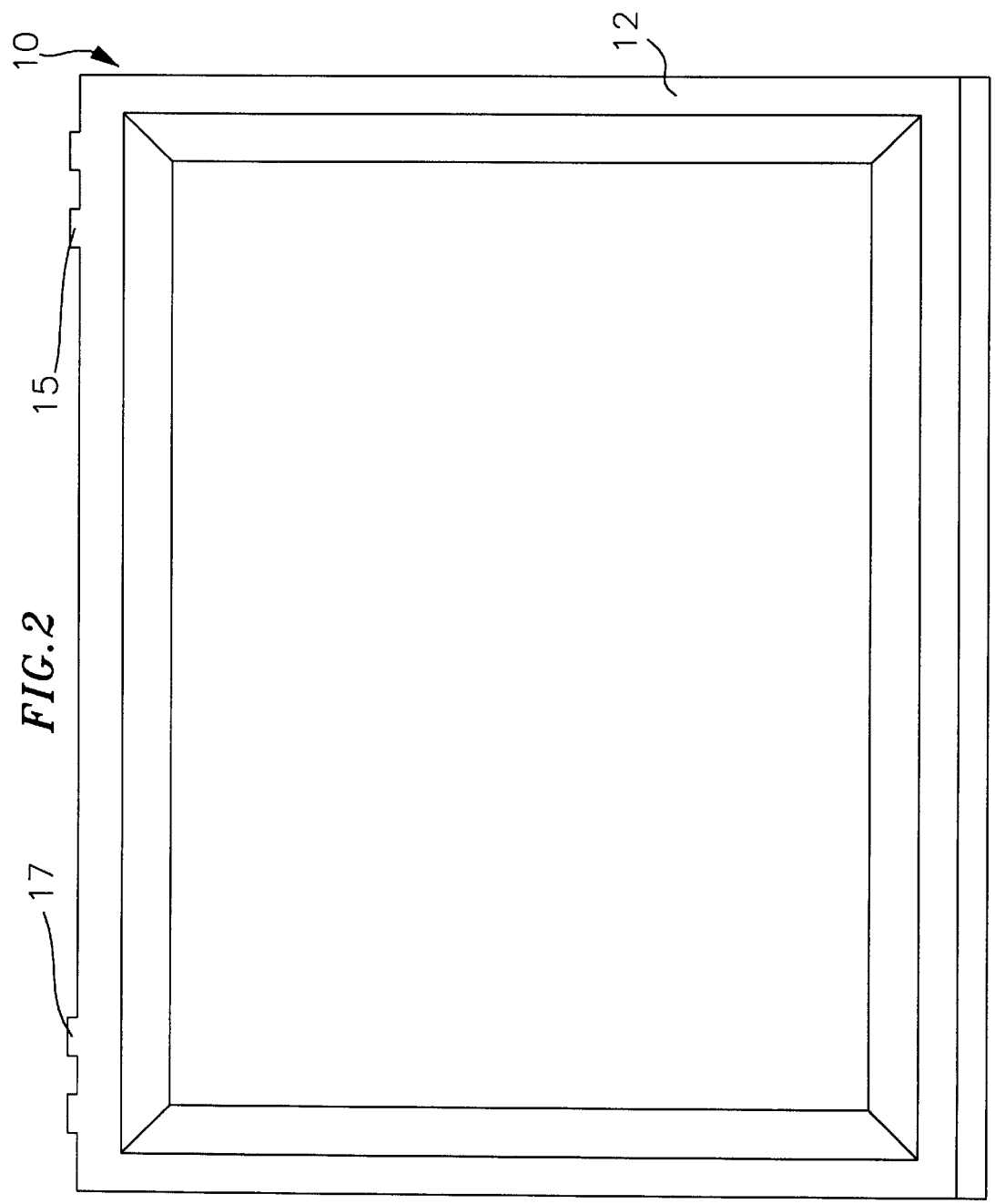
FIG. 2 is a top view of the apparatus of FIG. 1 with the top frame closed.
Figure 3:
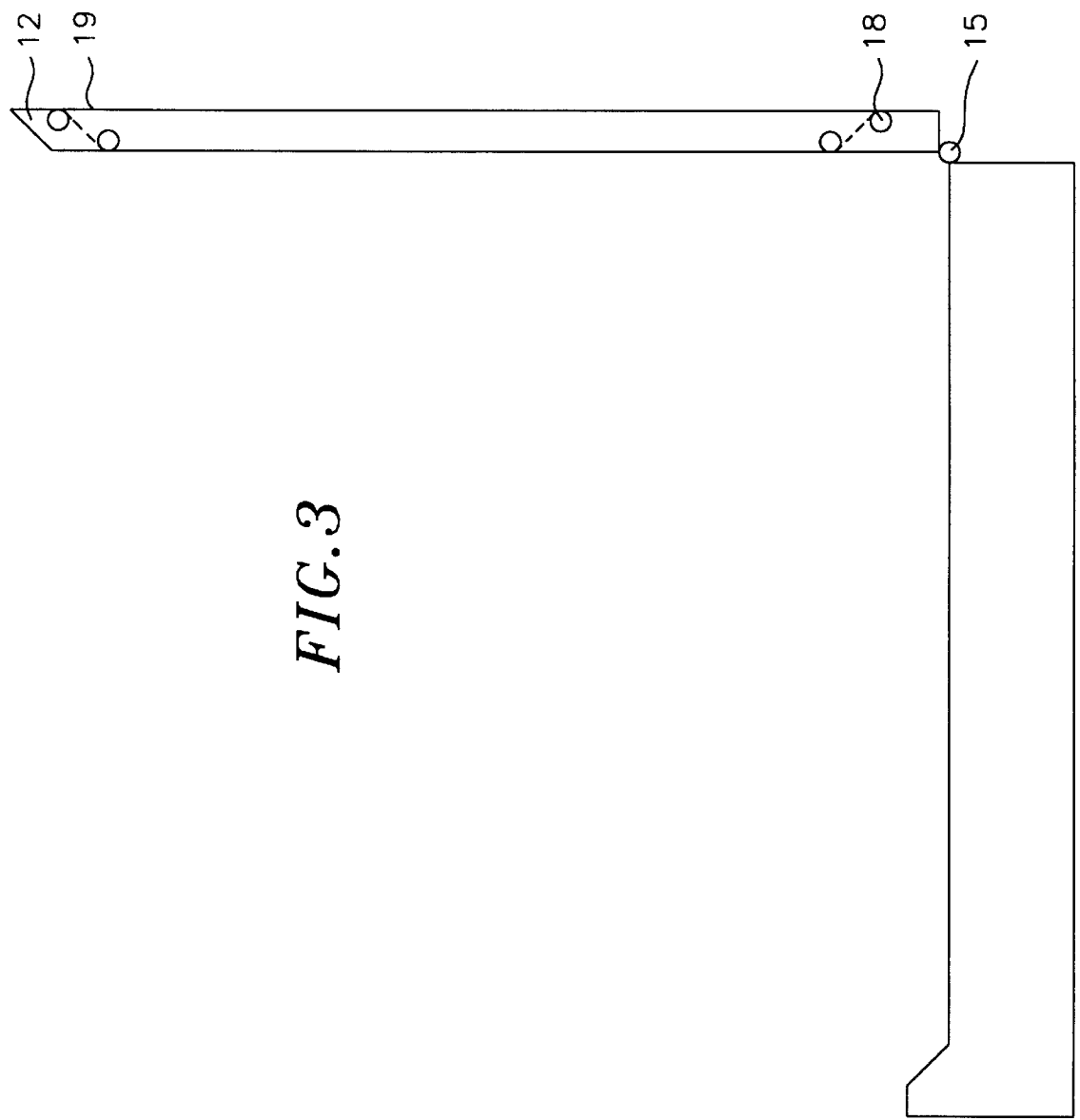
FIG. 3 is a side view of the apparatus of FIG. 1 with the top frame open.

Referring to FIG. 2, a top view of controller 10 shows hinges 15 and 17 for the see-through frame 12. Once open, as shown in FIG. 3, the page of television program listings is placed on the controller and the frame 12 is closed so that the page of television program listings can be seen through the open portion of the frame. Alternatively, a roll of pages of television program listings can be fed through slits 18 and 19 in the frame, displaying one page in the opening at a time. A user would press a position on the listings of the controller to record a program instead of the approach where the user enters the actual channel, date, time, and length (CDTL) commands.

Figure 4:
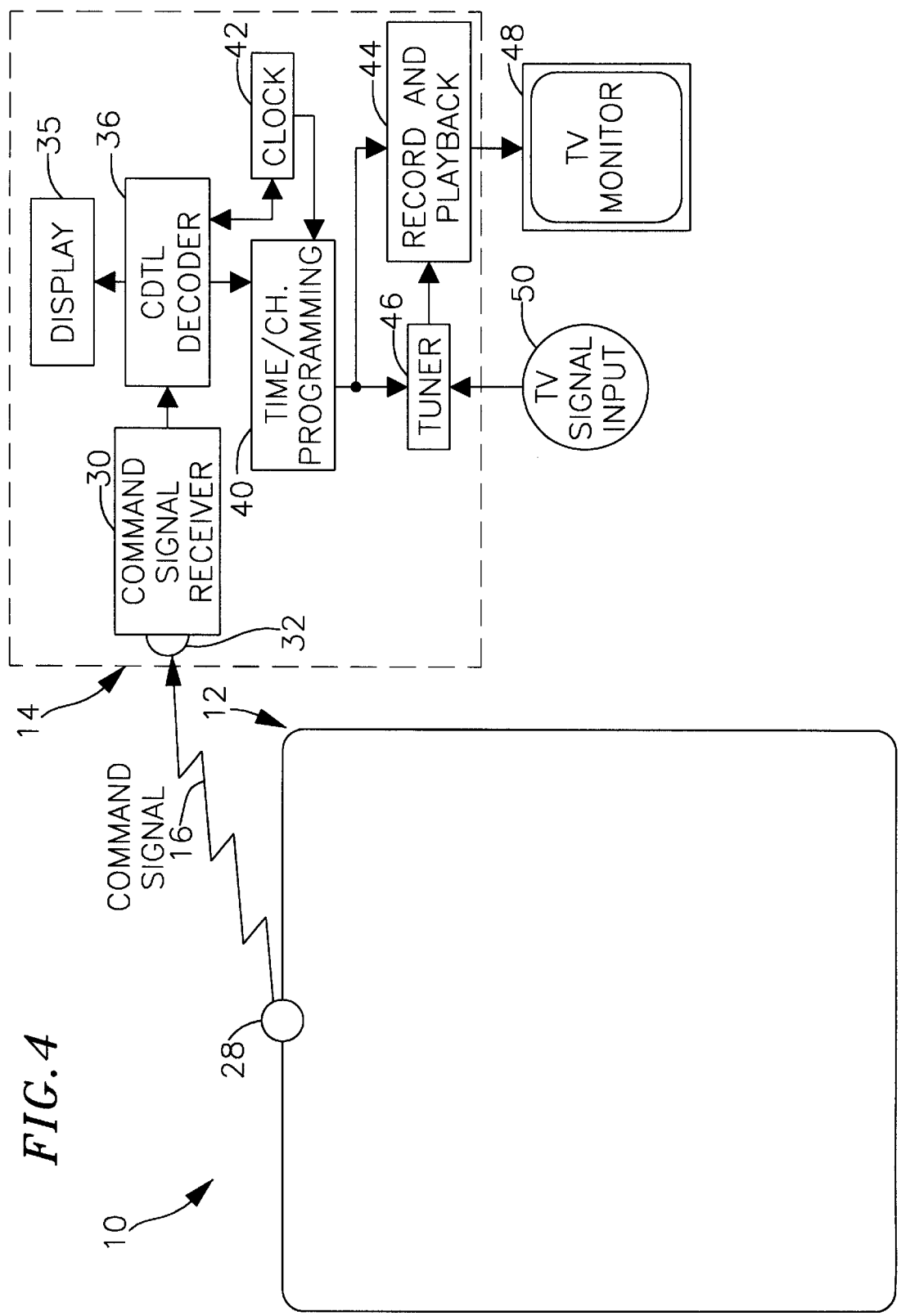
FIG. 4 is a schematic showing an apparatus according to this invention with the indicia decoder means embedded in the video cassette recorder.

Referring to FIG. 4, a videocassette recorder/player 14 is provided to be used in conjunction with controller 10. The encoded command signal 16 sent from the controller 10 is sensed by a photodiode 32 in the VCR and converted to electrical signals by command signal receiver 30. The electrical signals are sent to a CDTL decoder 36, which decodes the commands and determines how to respond to the commands. Built into the VCR is a clock 42. This is normally provided in a VCR and is used to keep track of the date and time. The clock 42 is used primarily by time/channel programming 40. The time/channel programming circuitry 40 is set up with the decoded CDTL information by the CDTL decoder 36. When the proper date and time is read from the clock 42, then the time/channel programming 40 function turns the record/playback circuit 44 function "on" to record. At the same time the tuner 46 is tuned to the proper channel in the television signal input circuit 18. Later the user can command the record/playback circuit 44 to a playback mode to watch the program via the television monitor 48.

An alternate way to control the recorder is to have the CDTL decoder 36 keep all the CDTL information, instead of sending it to the time/channel programming circuitry 40.

The CDTL decoder would also keep track of the time by periodically reading clock 42. The CDTL decoder would then send commands to the time/channel programming circuitry 40 to turn on and off the recorder and to tuner 46 to cause it to tune to the right channel at the right time according to the CDTL information.

Figure 5:
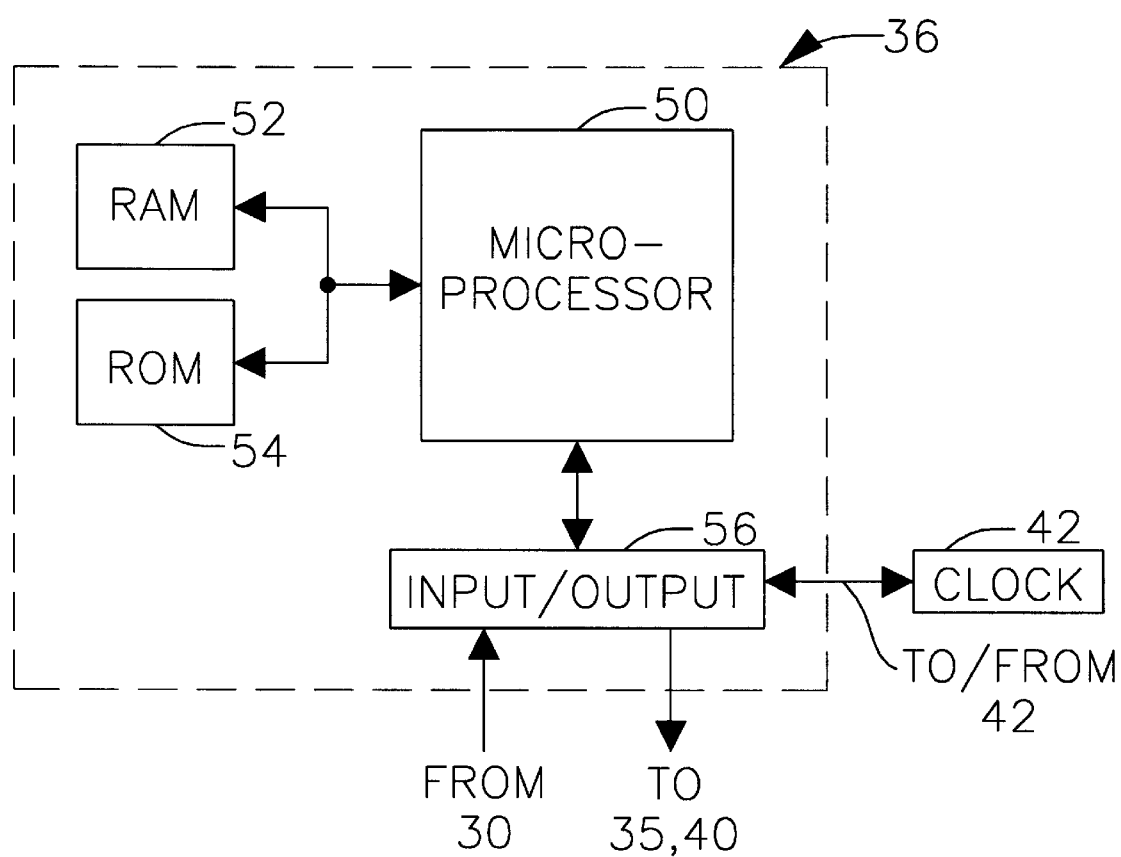
FIG. 5 is a schematic of the VCR embedded processors for code decoding.

A possible realization of the CDTL decoder 36 is shown in FIG. 5. The CDTL decoder 36 includes a microprocessor 50 and a memory, including RAM 52 and ROM 54, which is used for program storage. The decoder 36 also includes input/output circuit 56 adapted to receive commands from the command signal receiver 30 and the clock 42, and to output signals to a display 35, the clock 42, and the time/channel programming circuitry 40.

Figure 6:
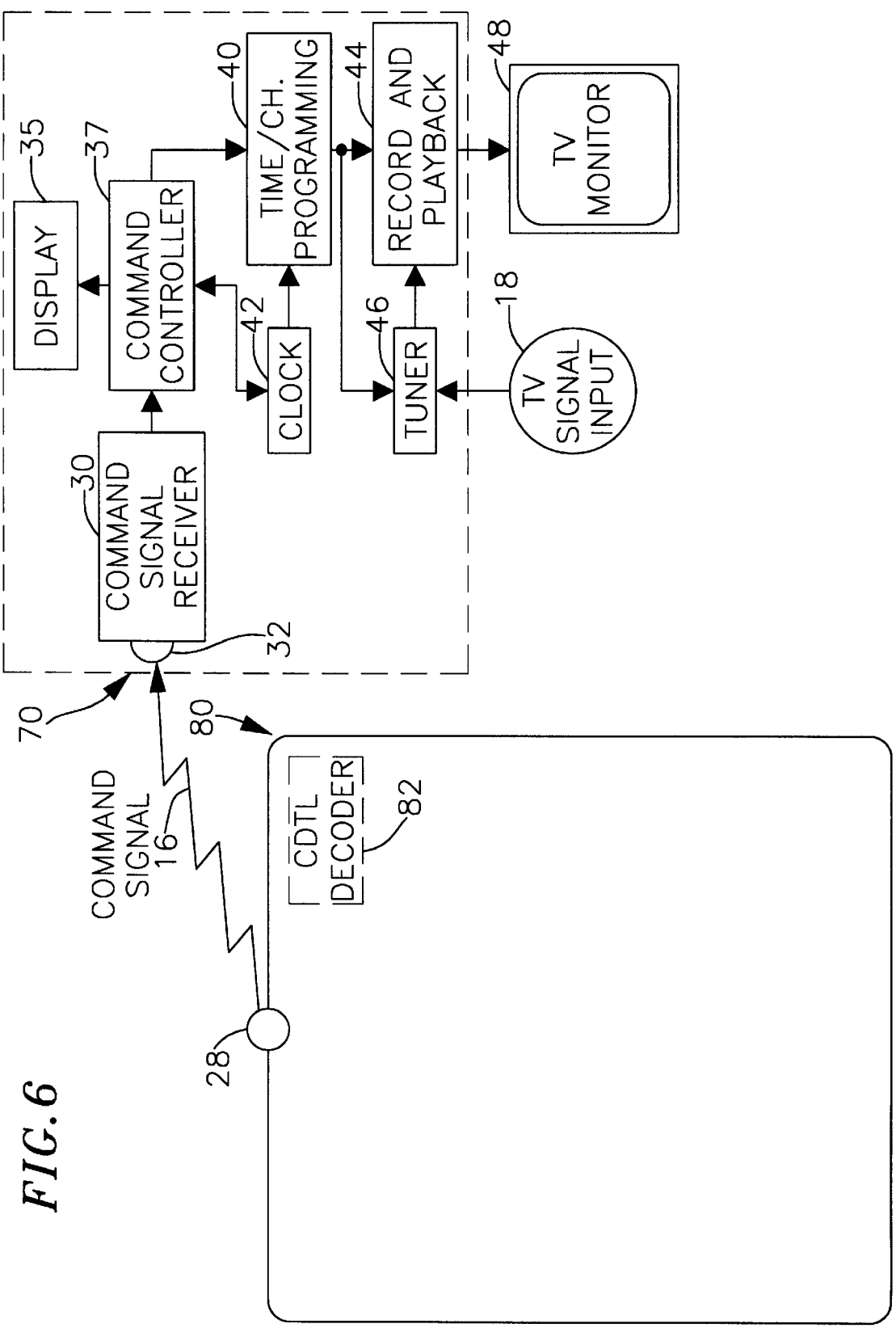
FIG. 6 is a schematic showing a preferred embodiment according to this invention with the indicia decoder means embedded in the controller.

FIG. 6 illustrates an alternate preferred embodiment of this invention. In FIG. 6 a controller 80 with embedded CDTL decoder 82 is provided which is very similar to controller 10, except for the addition of the CDTL decoder 82. This controller would be used in conjunction with a normal video cassette recorder/player 70, which would not be required to have an embedded CDTL decoder with the capability of decoding the remote control's command signal. The numerals for the subelements of video cassette recorder/player 70 are the same as described above for the video cassette recorder/player 14 and have the same function, except that the command controller 37 replaces the CDTL decoder 36 and does not decode CDTL information. This preferred embodiment has the advantages that it can be used in conjunction with VCRs that are presently being used that do not have the capability to decode the present invention's commands. Using the controllers that have this capability built in can vastly improve the capabilities used in timer preprogramming for a modest cost.

Figure 7:
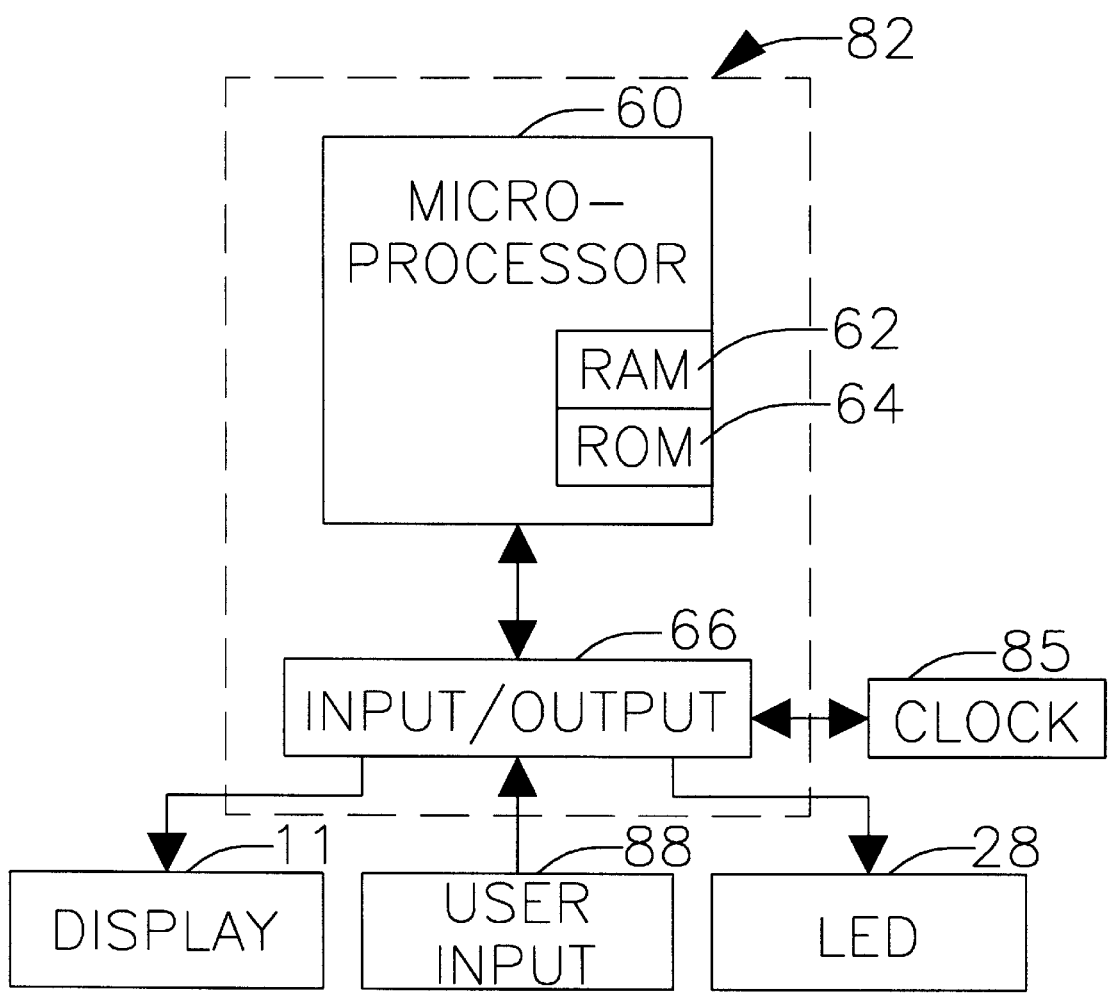
FIG. 7 is a schematic of the processor embedded in the controller.

FIG. 7 illustrates a possible realization of the CDTL decoder 82 built into the controller 80. A microprocessor 60 and a memory including RAM 62 and ROM 64 coupled through an input/output circuit 66 can be used to interface with the user input 88, display 11, light emitting diode 28, and a clock 85. Alternately, other hardware implementations can be used to perform the CDTL decoding.

The controller with embedded CDTL decoder as described above would send channel, date, time and length information to the video cassette recorder/player 70, which would use the CDTL information for tuning to the correct channel and starting and stopping the recording function. The controller may have to be unique for each different video cassette recorder/player, because each brand or model may have different infrared pulses for each type of information sent from a typical controller, such as the channel memory keys and start record and stop record keys. The particular infrared pulses used for each key type of the brand can be called the vocabulary of the particular controller. Each model may also have a different protocol or order of keys that need to be pushed to accomplished a function such as timer preprogramming. The protocol or order of keys to accomplish a function can be called sentence structure. If there is a unique controller built for each model type, then the proper vocabulary and sentence structure can be built directly into the ROM 64 of the controller.

An alternate to having the controller with embedded CDTL decoder send channel, date, time and length information to the video cassette recorder/player 70, is to have the controller with embedded CDTL decoder perform more operations to simplify the interfacing problem with existing video cassette recorders/players. In particular, if the controller not only performs the command decoding to CDTL, but also keeps track of time via clock 85 as in FIG. 7, then it is possible for the controller to send just channel, start record and stop commands to the video cassette recorder/player. The channel, start and stop commands are usually basic one or two key commands for each brand of video cassette recorder, which means there is no complicated protocol or sentence structure involved. Thus, to communicate with a diverse set of video cassette recorder/player models it is only necessary to have memory within the controller, such as ROM 64 of FIG. 7, for storing the protocol for all the models or at least a large subset.

The position on the schedule page of television program listings would be entered on the controller as before and decoded into channel, date, time and length information, which would be stored in the RAM 62 of the controller. Via clock 85, the time would be checked and when the correct time arrives the controller would automatically send out commands to the VCR unit for tuning to the correct channel, and for starting and stopping the recording. It is estimated that only two (2) bytes per key for about 15 keys need to be stored for the vocabulary for each video cassette recorder/player model. Thus, to cover 50 models would only require about 30*50=1,500 bytes of memory in the controller. It would be necessary to position the controller properly with respect to the VCR unit so that the infrared signals sent by the controller are received by the unit.

Figure 8:
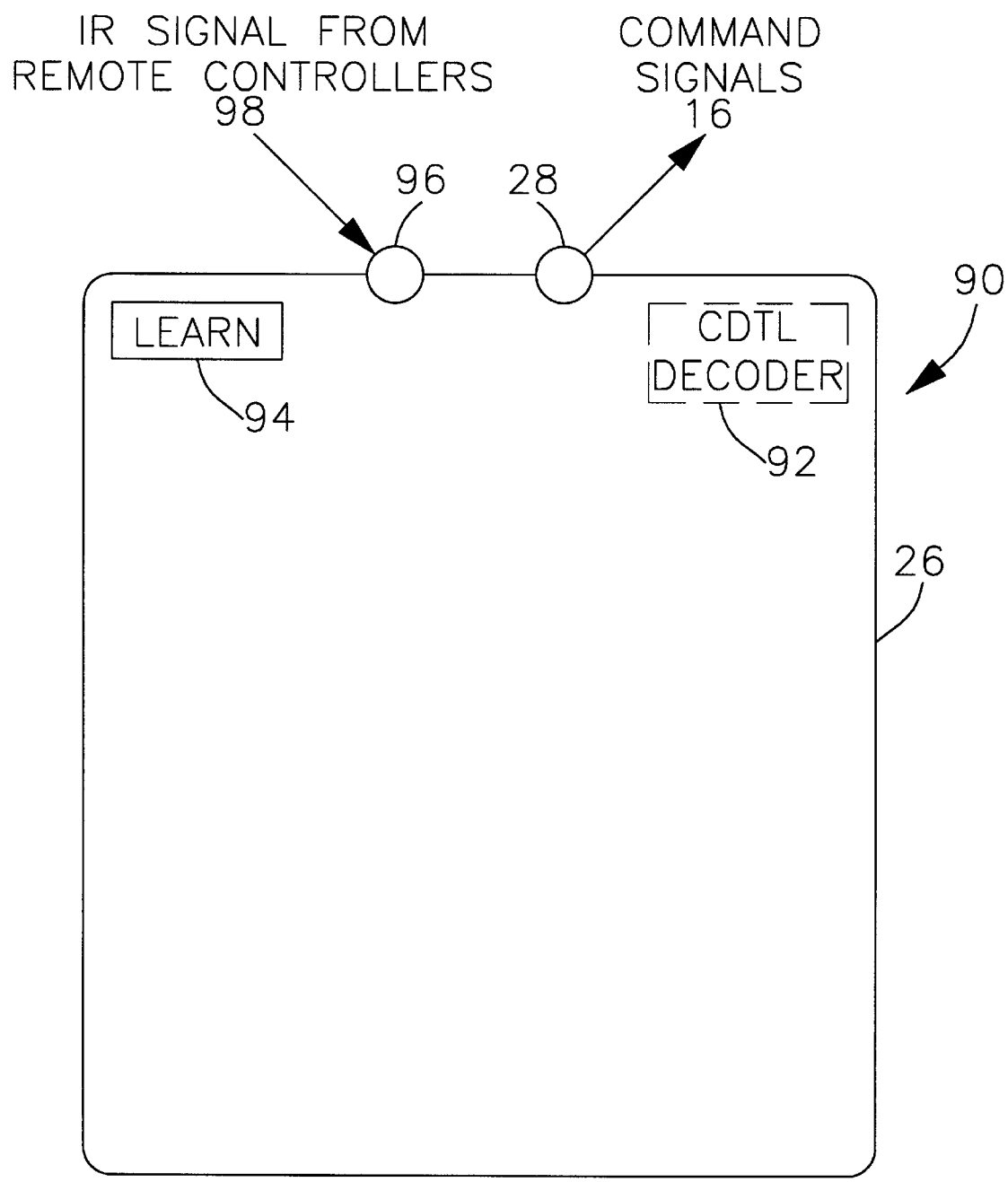
FIG. 8 is a schematic of a universal controller with the code decoder means embedded in the universal controller.

Another preferred embodiment illustrated in FIG. 8 is to provide a universal controller 90 with an embedded CDTL decoder 92. Universal controllers provide the capability to mimic a number of different controllers. This reduces the number of controllers a user needs to have. This is accomplished by having a learn function key 94 on the universal controller. If the learn function key 94 is pushed in conjunction with a position on the schedule page for a short period of time, the unit will enter into the learn mode. Incoming infrared pulses from the controller to be learned are detected by the infrared photodiode 96, filtered and wave-shaped into recognizable bit patterns before being recorded by a microcontroller into a battery-backed static RAM 62 as the particular IR pulse pattern for that particular key. This is done for all the individual keys by the user so that the universal controller 90 can deduce and record the protocol of the timer preprogramming sequence. This is necessary because different VCRs may have different timer preprogramming command formats.

FIG. 7 illustrates a possible realization of the CDTL decoder 92 that could be built into universal controller 90. A microprocessor 60 can be used as before to decode the CDTL information, as well as for interfacing with the input/output functions, including the photodiode 96. Alternately, the CDTL information can be determined with other hardware implementations.

Figure 11:
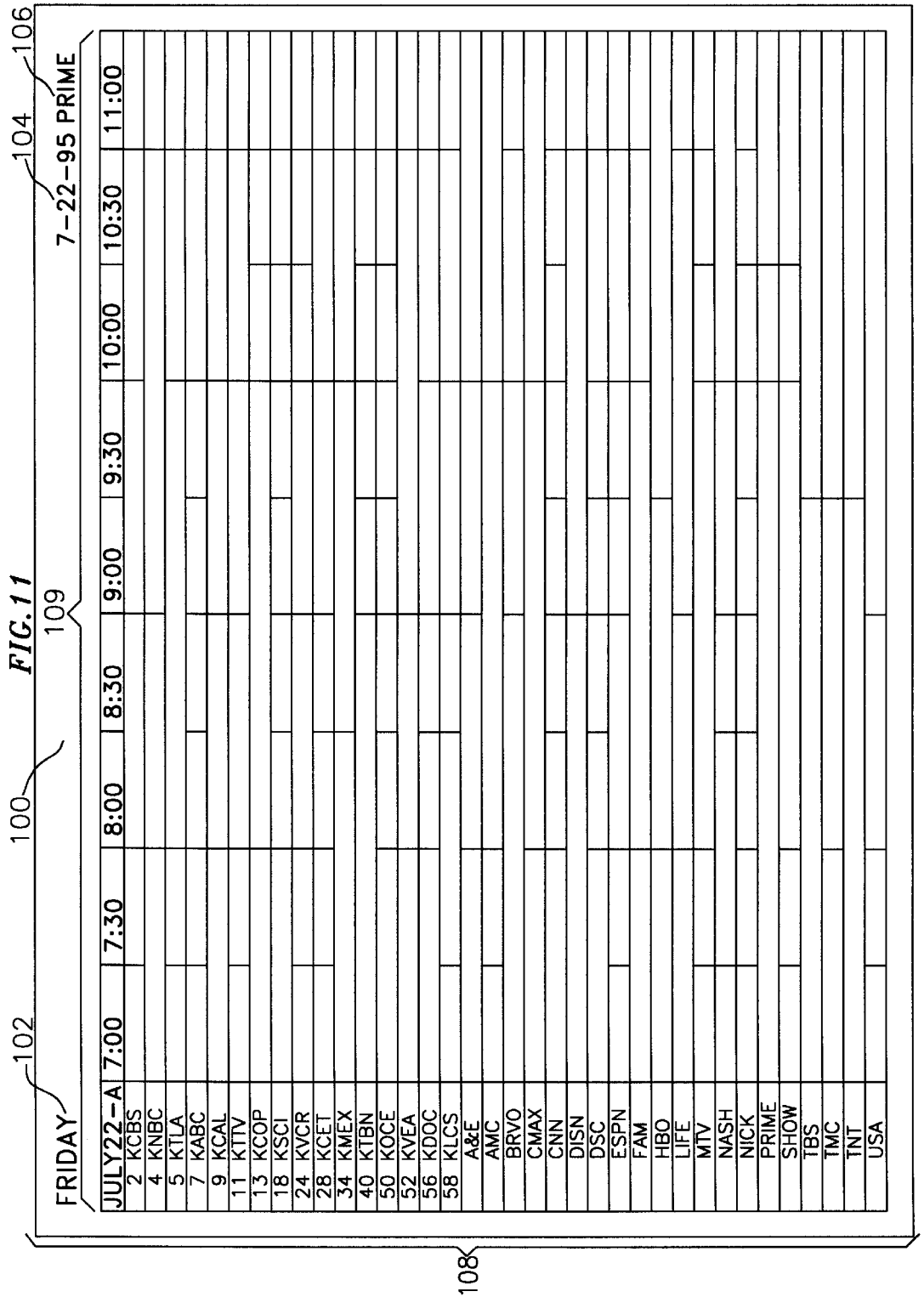
FIG. 11 is an illustration of a schedule page of television program listings.

There are a number of ways that the CDTL information can be represented and determined from the schedule page of television program listings. One example of a schedule page which is used by the present invention is depicted in FIGS. 11–14. Referring to FIG. 11, the front side of the schedule page contains, in a top portion 100, the information identifying the specific schedule page, including the day of the week 102, date 104 and period of the day 106 of the page. Below this information, the programming schedule is presented in tabular format wherein the horizontal rows 108 represent network programming listing each channel a user is able to receive and vertical columns 109 represent the various time periods for the period of the day of the present schedule page. Thus, a multihour block of programming identifying the television programs on numerous networks is graphically represented in a small space. For example, the horizontal rows are represented in FIG. 11 by networks ranging from KCBS to USA, which are identified along the vertical axis of the tabular format. Alternately, the vertical columns are represented by the time periods ranging from 7:00 p.m. to 11:30 p.m identified along the horizontal axis.

Figure 13:
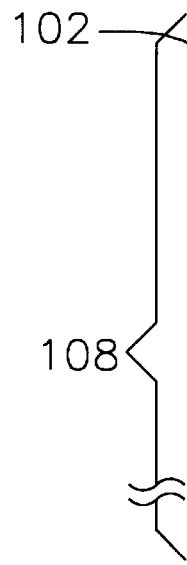
FIG. 13 is an illustration of the top left most portion of the schedule page of FIG. 11.

In further detail with reference to FIG. 13, the schedule page provides an excellent guide for users which shows the specific channel and the start and end times of television shows which users may wish to view or record. By examining the page, it is easy to see that the television show "Real Cops" begins at 7:00 p.m. on channel 2 and ends at 7:30 p.m. In addition, the television show "People" begins at 7:30 p.m on channel 2 and ends at 8:00 p.m. The user is thus provided a convenient guide to television programs to be viewed and/or recorded.

Figure 12:
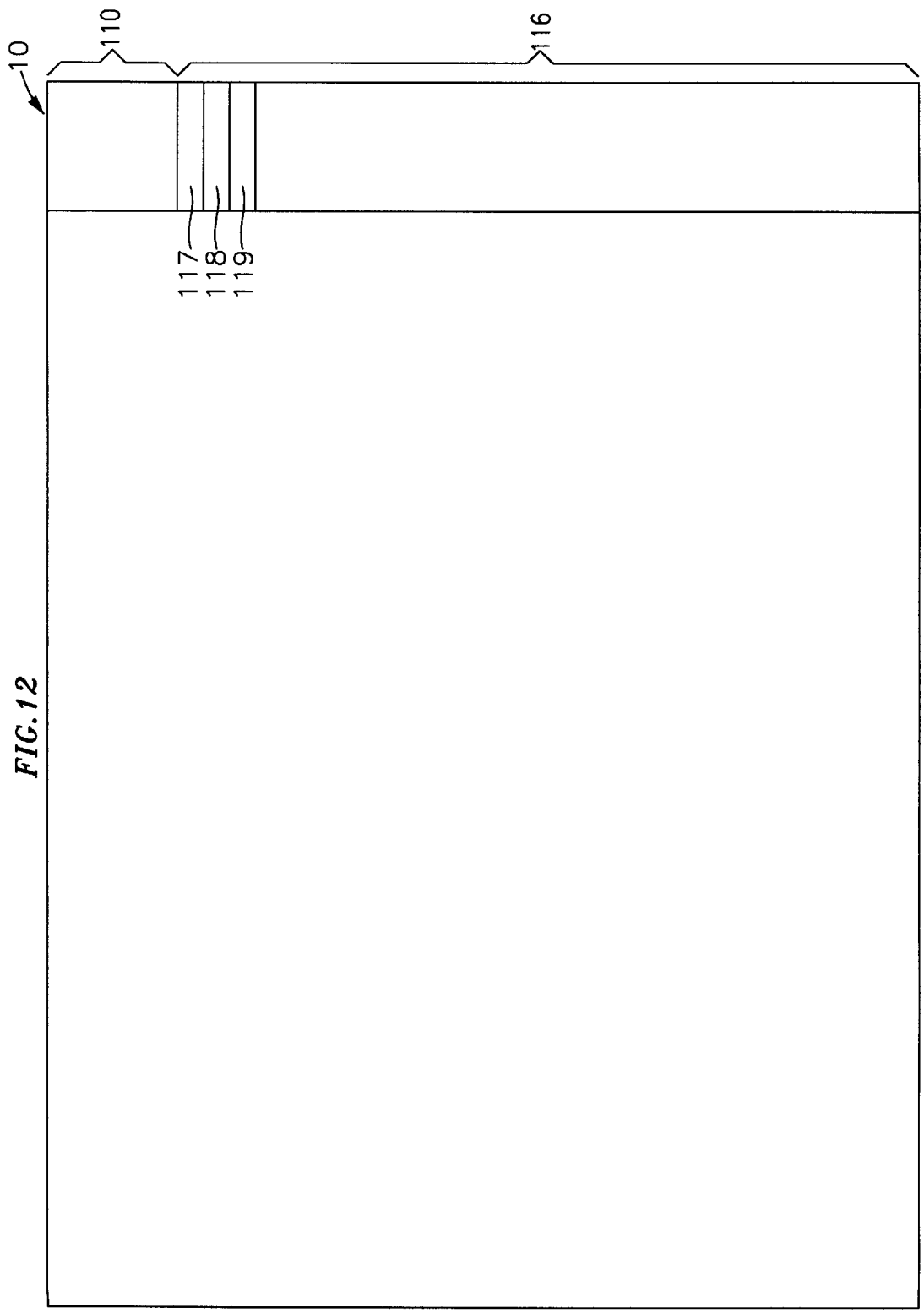
FIG. 12 is an illustration of the reverse side of the schedule page of FIG. 11.
Figure 14:
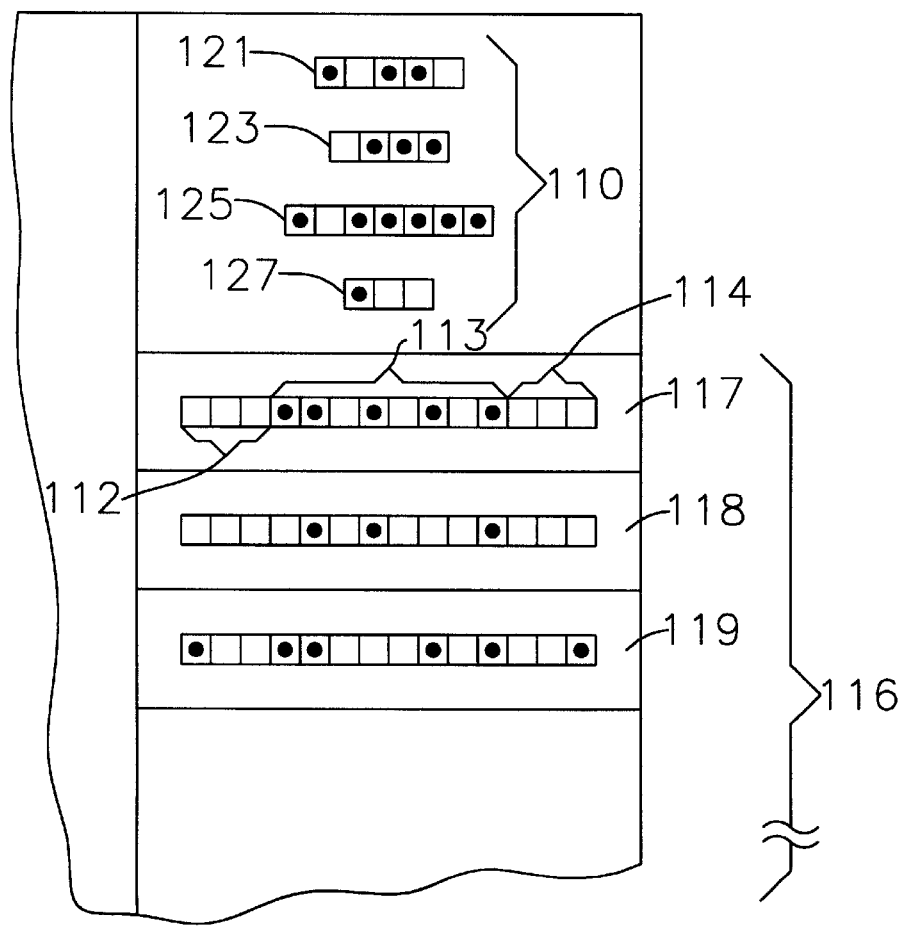
FIG. 14 is an illustration depicting the top right most portion of the reverse side of the schedule page of FIG. 11, specifically detailing the control indicia of FIG. 12.

In FIG. 12, the reverse side of the schedule page is depicted. This side of the page contains the control indicia for the specific television programs presented on the front side which are to be read by sensor elements found within the controller. The upper right-hand portion of the reverse side contains binary encoded page identity indicia 110 which designates the day, month, year and period of the day of the present schedule page. Referring to FIG. 14, the information 121 pertaining to the day is encoded in five bits. By using five bits ($2^5=32$), each day of each month may be binary encoded from the first to the thirty-first by using respectively binary zero to binary thirty bit representations. Below the day, the month information 123 is provided and is designated by four bits ($2^4=16$) so that all twelve months may be encoded from January to December by using respectively binary zero to binary eleven. In the third row of information 125, the years are set forth by seven bits ($2^7=127$) in order to identify each year of a particular century through the use of binary zero to binary ninety-nine. Finally, the fourth row of information 127 includes the period of the day designated by three bits ($2^3=8$), which allows up to eight separate periods. In a typical embodiment, the schedule page includes six periods designated respectively by binary zero to binary five for early morning, late morning, early afternoon, late afternoon, prime and late prime. Based on the period of the day, the CDTL decoder knows the time periods of the schedule page presently being viewed.

Below the page identifier control indicia 110 which contains the day, month, year and period of the day of each grid is the column of program start and end time control indicia 116 which contains the specific start and end times for each program found in the row of networks 108 on the front of the schedule page. The start and end time indicia for each network is located directly behind the listing of the network's name on the front side of the schedule page. In the preferred embodiment, the number of bits utilized for this start and end time indicia is six plus the number of intermediate half-hour time periods found on the schedule page, wherein the number of intermediate periods does not include the initial and final time periods of each page. As depicted in the schedule page in FIG. 11, there are eight intermediate half-hour time periods (i.e., 7:30 p.m.; 8:00 p.m.; 8:30 p.m.; 9:00 p.m.; 9:30 p.m.; 10:00 p.m.; 10:30 p.m.; 11:00 p.m.); thus, the total number of bits is fourteen.

The reason for the six additional bits will be evident from the following discussion in relation to FIG. 14. The first three bits 112 of the control indicia 116 depict in a binary representation the length of time prior to the initial time period of the schedule page (i.e., 7:00 p.m. in FIG. 11) the first program for each network begins. That is, the first program of each network (or for each row) may begin prior to the initial time period of the schedule page presently being viewed, and control indicia are necessary to designate how long before the initial time period of the present schedule page the first program of each network, or row, begins. Similarly, the final three bits 114 of the start and end time control indicia of a particular row from the schedule page designate in a binary representation how far after the final time period (i.e., 11:30 p.m. in FIG. 11) the last program on the particular row ends. By using three bits to binary encode up to eight ($2^3=8$) half-hour periods prior to the first time period of the page for the first program on each row to begin or eight half-hour periods after the final time period of the schedule page for the final program on each row to conclude, the preferred embodiment can determine whether the program the user has selected began up to four hours before the initial time period of the present schedule page or whether the program the user has selected ends up to four hours after the final time period of the present schedule page.

The eight intermediate bits 113 between the first three bits 112 and the final three bits 114 represent each specific intermediate half-hour time period found on the schedule page (i.e., 7:30 p.m., 8:00 p.m., 8:30 p.m., 9:00 p.m., 9:30 p.m., 10:00 p.m., 10:30 p.m., 11:00 p.m. in FIG. 11) and contain start and end time control indicia which correlates with the start and end time of each program found on each network row 108 in FIG. 11. That is, a bit will be designated, or set to one, if a program starts or ends specifically at that time period. The use of these bits to designate the start and end times of programs will become more evident when the example of actual operation is presented.

Figure 9:
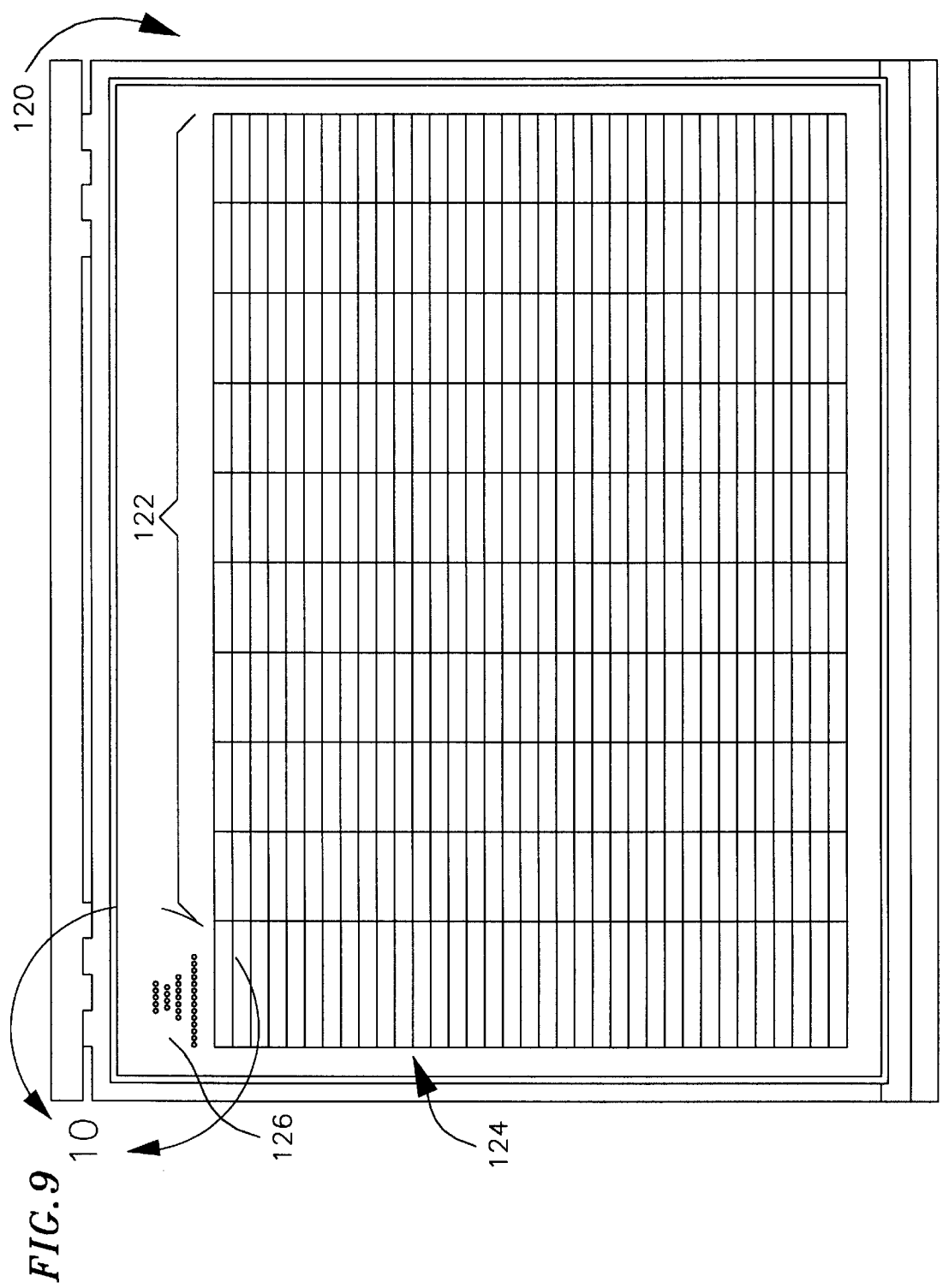
FIG. 9 is a top view illustrating the components of the apparatus of FIG. 1 within a controller.
Figure 10:
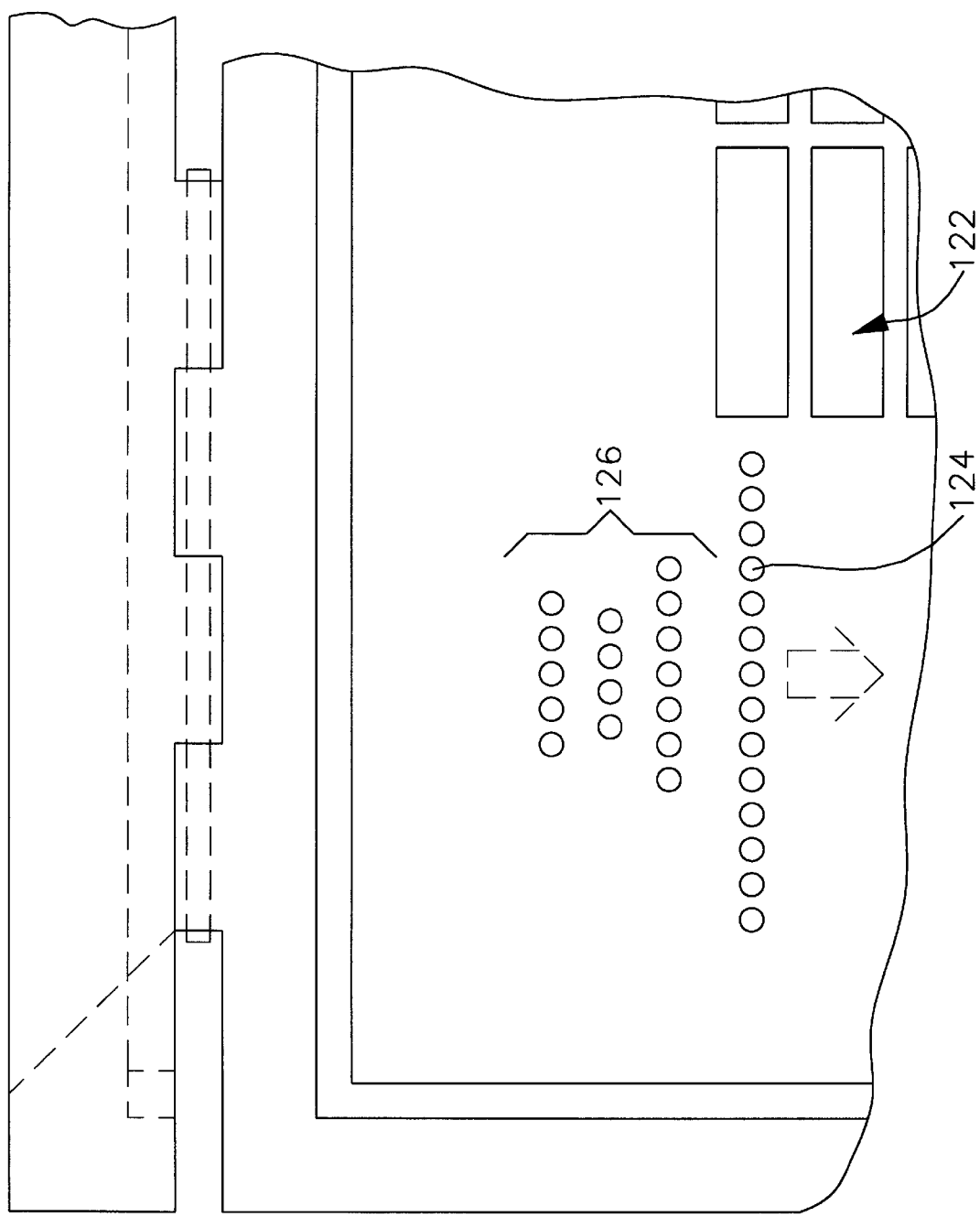
FIG. 10 is a plan view of the top left corner of the controller detailing the sensor elements of the controller.

The control indicia 110 and 116, discussed above, are read by sensor elements within the controller, and the information is sent to the CDTL decoder, wherever located in the video system. An exemplar embodiment of the controller for use with the schedule page of television program listings is described below with reference to FIGS. 9 and 10. The controller contains an array of switches generally designated by 122 wherein the array has a corresponding number of rows as the network rows 108 and columns as the number of time period columns 109 located on the schedule pages of television program listings which are to be used with the controller. Each switch is designated by its row number and column number. To the left of each row of switches, sensor elements generally designated by 124 are located that read the program start and end time indicia 116 located on the reverse side of each schedule page. In a preferred embodiment, the sensor elements 124 are optical readers. Referring to FIG. 10, the number of sensor elements for each row of switches 122 corresponds to the number of start and end time control indicia, which is fourteen in the exemplar embodiment. Finally, sensor elements 126 are located in the upper left-hand corner of the controller that read the page identifier control indicia 110 that determine the particular day, month, year, and period of the day of the schedule page being viewed. These sensor elements 126 are also preferably optical readers with each bit of control indicia being represented by a dark circle for one binary bit and a clear circle for the other binary bit.

Figure 15A:
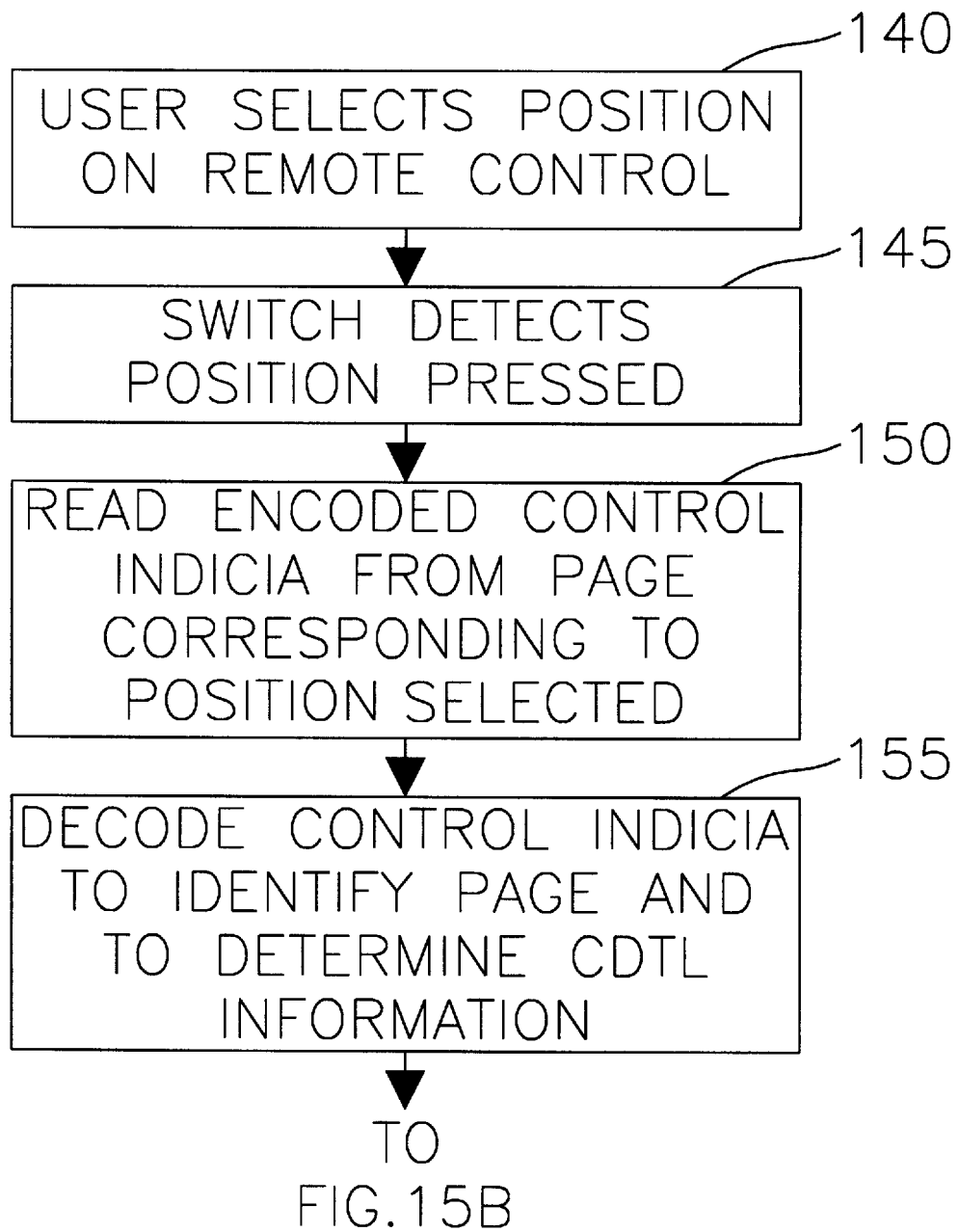
FIGS. 15A and B are flow charts detailing the method of operation of the present invention.
Figure 15B:
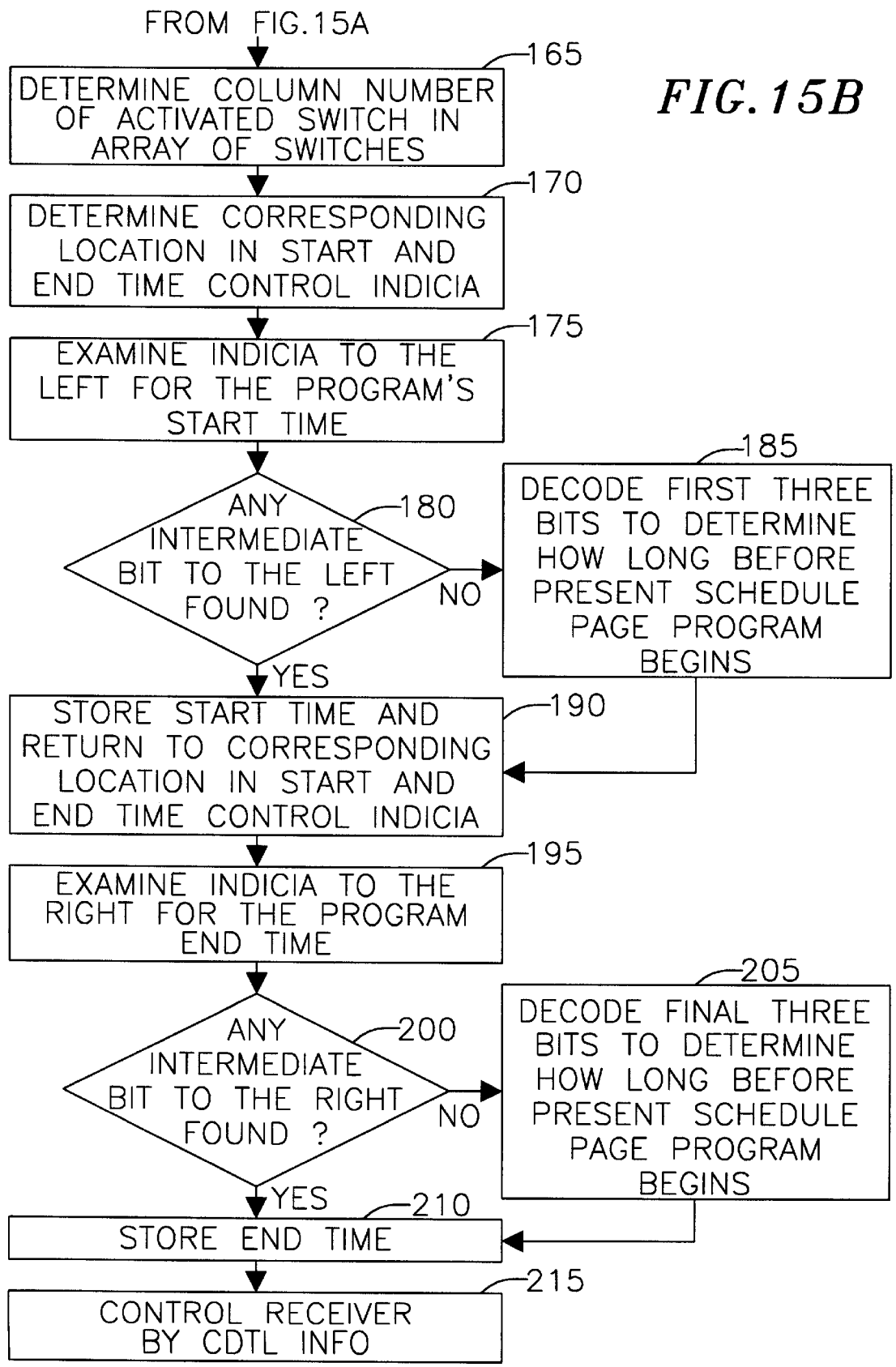

In actual operation as seen in FIGS. 15A and 15B, after a user, in step 140, selects a specific program by pressing on the position of the program on the schedule page, the switch corresponding to the row and column of the program position is activated and detects the position pressed (Step 145). The row and column number of the activated switch is stored in the CDTL decoder's RAM.

Next, (150) the page identifier control indicia, which is encoded in binary, is read by the sensor elements 126 and the start and end time control indicia 116, corresponding to the row number of the activated switch, is also read by sensor elements 124. Thus, these control indicia are read and sent to the CDTL decoder.

Following this, the control indicia are decoded (155) to determine the CDTL information. The page identifier control indicia is decoded to determine the day, month, year and period of the day. The CDTL decoder uses the start and end time control indicia and the column number of the activated switch to decode this indicia in order to determine the start and end time of the program. The activated switch's column number designates where analysis of the start and end time control indicia begins. Since each vertical column of the schedule page, wherein a corresponding switch is located within the controller, is found between two distinct time periods of the schedule page (i.e., between 7:00 p.m. and 7:30 p.m.; between 7:30 p.m and 8:00 p.m.; between 8:00 p.m. and 8:30 p.m; etc.) and each time period except the initial time period and final time period is represented by an intermediate bit 113 of the start and end time control indicia, the activated switch's column number corresponds to a position within the start and end time control indicia between either the first three bits and the first intermediate bit, two of the intermediate bits, or the last intermediate bit and the final three bits.

More particularly, the column of the schedule page between time periods 7:00 p.m. and 7:30 p.m. and the respective switch within the remote control correspond to the position between the first three bits and the first intermediate bit of the start and end time control indicia. The column between 7:30 p.m. and 8:00 p.m. and the respective switch correspond to the position between the first and second intermediate bits. The column between 8:00 p.m. and 8:30 p.m. and the respective switch correspond to the position between the second and third intermediate bits. The columns following this correspond in a similar manner until the final column of the schedule page is reached between 11:00 p.m. and 11:30 p.m. wherein this column and the respective switch correspond to the position between the last intermediate bit and the final three bits of the start and end time control indicia.

Therefore, with reference to FIG. 15B, the CDTL decoding technique will first (165) determine the column number of the activated switch. The CDTL decoder will then (170) examine the start and end time control indicia starting from the location that corresponds to the column number of the activated switch.

From this location, the bits to the left of the column location are examined (175) for the first marked intermediate bit, which is the program's start time. If no intermediate bits are marked or exist to the left of the column location (180) (i.e., the activated switch corresponds to the first column of the schedule page), then the first three bits are read (185) to determine how long before the present schedule page's initial time period the program started.

Next, the CDTL decoder returns to analyzing the start and end time control indicia from the (190) location corresponding to the column number of the activated switch. The bits to the right of the column location are examined (195) for the first marked intermediate bit, which is the program's end time. It is determined (200) whether any intermediate bits to the right are found. If no intermediate bit is marked or none to the right of the column location exists, then the last three bits are read (205) to determine how long after the final time period of the present schedule page the program ends. Finally, the end time is stored (210), and this decoded CDTL information is used to control (215) the television receiving unit 14.

Referring to FIGS. 13 and 14, a discussion of an exemplary use of the present invention will follow. Assume the program selected by the user is "Baseball" on channel 5, found on the third row, and assume the user pressed the schedule page in the location corresponding to the column between 7:00 p.m. and 7:30 p.m. In addition, assume "Baseball" begins at 5:00 p.m. (prior to the initial time period of the present schedule page). The start and end time control indicia for this third row 119 from left to right has the first, fourth, fifth, ninth, eleventh, and fourteenth positions marked. The corresponding switch activates the sensor elements 124 located on the same network row in the controller to read the program start and end time control indicia 116 for that row, channel 5, from the reverse side of the schedule page in addition to the page identifier control indicia 110.

Depending on the embodiment used, the CDTL decoding of the start and end time control indicia and the page identifier control indicia can be built into the CDTL decoder 36 in the VCR in FIG. 4 or the embedded CDTL decoder 82 in FIG. 6, as described previously. The CDTL decoder in the remote control or in the VCR interprets the two control indicia. First, the page identifier control indicia 110, which is encoded in binary, is interpreted to find the day, month, year and period of the day.

In this example, the day has the second, third, and fifth binary positions designated. The CDTL decoder would interpret this binary designation of the day to be twenty two. The month has the first, second and third binary positions marked. The binary interpretation of this is seven, which designates the seventh month, July. The year has the first, second, third, fourth, fifth and seventh binary positions marked to indicate ninety-five, which is the year, 1995. The period of the day has the third position designated. This binary representation is decoded to be the fourth period of the day which is the prime time period. The CDTL decoder knows the initial time period and final time period for each period of the day; in this exemplar embodiment as shown in FIG. 11, the prime time period begins at 7:00 p.m. and ends at 11:30 p.m.

The start and end time control indicia is also analyzed. Since the user pressed "Baseball," the present example would read the start and end time indicia 119 in FIG. 14 of the third row—the row number of the activated switch. The column number of the activated switch is one since the user pressed the position on the schedule page between 7:00 p.m. and 7:30 p.m. The CDTL decoder will analyze the start and end time indicia from the corresponding location represented by the activated switch which is between the first three bits and the first intermediate bit. First, searching to the left of the column location for the start time of the selected program, the CDTL decoder will analyze the first three bits since no intermediate bits exist to the left of column one. The decoding technique interprets the first three bits, of which only the third binary position is marked representing a binary four, to designate that the program began at 5:00 p.m., which is four half-hour periods prior to the first time interval (7:00 p.m.) of the present schedule page.

Next, the decoder will return to analyzing the start and end time control indicia from the location corresponding to the activated switch's column, column one, which is between the first three bits and the first intermediate bit and look for the first marked intermediate bit to the right of this location for the end time. A control marker at the first of the eight intermediate bits designates that the program "Baseball" concludes at the first intermediate time period, which is 7:30 p.m. Therefore, by pressing on the position of "Baseball" on the schedule page, the CDTL information will be decoded from the control indicia to designate the television receiver to turn on at 5:00 p.m. and turn off at 7:30 p.m. on channel 5 on Jul. 22, 1995. Therefore, the user can simply view a schedule page, determine which program he or she wishes to view, and press one position on the page to view the selected program. The great benefits provided to a television viewer by the present invention can be readily seen since a television viewer may examine a schedule page of television program listings at his leisure and program the television receiving unit to turn on and off at a specific time.

The invention has now been described in detail as required by the patent statute. Those skilled in the art will recognize modifications and substitutions to the embodiment disclosed herein. Such modifications and substitutions are encompassed within the present invention as defined in the following claims. The term "television receiving unit" as used in the claims refers to a device capable of intercepting a television signal, e.g., a television set, a VCR, a cable box, or a satellite receiver.

What is claimed is:

1. An apparatus for controlling a television receiving unit to receive a television program, comprising:
    means for receiving a listing of television programs, wherein the listing bears printed schedule indicia for a plurality of programs, each said program defined by a channel, a start time and a duration;
    detection means for the apparatus to determine a position on said listing, said position corresponding to the schedule indicia of a selected program of said plurality of programs;
    determining means for the apparatus to determine the channel, start time and duration of the selected program in response to the position; and
    control means for controlling the receiver to receive said channel for said duration from said start time.

2. The apparatus of claim 1 wherein the schedule indicia are formed as a grid, a first axis of the grid corresponding to a plurality of channels and a second axis corresponding to clock time.

3. The apparatus of claim 2 wherein the schedule indicia are operably visible on a front side of the listing and wherein determining means comprises a reader for reading control indicia on the listing.

4. The apparatus of claim 3 wherein the control indicia are on a back side of the listing identifying a date and period corresponding to the listing.

5. The apparatus of claim 3 wherein the control indicia are formed in a first portion identifying a date and period corresponding to the listing and a plurality of channel-specific portions, each channel specific portion identifying times within the period at which programs on a corresponding channel start and end.

6. The apparatus of claim 1 wherein the detection means comprise sensor means for detecting pressure applied by the user to the listing.

7. The apparatus of claim 6 wherein the schedule indicia are formed as a grid, a first axis of the grid corresponding to a plurality of channels and a second axis corresponding to clock time.

8. The apparatus of claim 7 wherein the sensor means comprise an array of switches, said array having first and second axes aligned with the first and second axes of the grid.

9. The apparatus of claim 1 wherein the control means further controls a video recorder to record the select program.

10. The apparatus of claim 1 wherein the apparatus is remote of said television receiving unit.

11. The apparatus of claim 1 wherein the listing comprises a page of television program information.

12. The apparatus of claim 1 wherein the listing comprises a roll of television program information.

13. The apparatus of claim 12 wherein the roll comprises a plurality of pages of television program information connected to each other.

14. A method of controlling the operation of a television receiving unit to receive a television program comprising the steps of:
    detecting pressure applied by a user to a position on a page of television listings identifying respective television programs to select one of the television programs for reception;
    determining the channel, start time, and duration of the selected program in response to the pressure; and
    controlling the receiver to receive said channel for said duration from said start time.

15. The method of claim 14 wherein the step of detecting pressure applied by a user to a position on a page of television listings comprises sensing a signal from a sensor activated by the pressure applied by the user, where the activated sensor is one of an array of sensors located behind the respective television programs.

16. The method of claim 14 wherein the step of determining the channel, start time, and duration of the selected program comprises reading control indicia on the page of television listings.

17. The method of claim 16 wherein the step of determining the channel, start time, and duration of the selected program further comprises decoding the control indicia.

18. The method of claim 14 further comprising the step of controlling a video cassette recorder to record the selected program.

19. The method of claim 14 wherein the step of determining the channel, start time, and duration of the selected program further comprises reading row and column number of a sensor activated by the pressure.

20. The method of claim 19 wherein the step of determining the channel, start time, and duration of the selected program further comprises reading an encoded program indicia printed on the back of the page of television listing, where the encoded program indicia corresponds to the row number.

21. The method of claim 20 wherein the step of determining the channel, start time, and duration of the selected program further comprises reading an encoded page identifier indicia corresponding to the page of television listing.

22. The method of claim 21 wherein the step of determining the channel, start time, and duration of the selected program further comprises decoding the encoded program and page identifier indicia and generating control signals for the selected television program by the column number.

* * * * *